(12) United States Patent
Thomas et al.

(10) Patent No.: US 6,729,062 B2
(45) Date of Patent: May 4, 2004

(54) MIL.DOT RETICLE AND METHOD FOR PRODUCING THE SAME

(76) Inventors: Richard L. Thomas, 920 Breckenridge La., Winchester, VA (US) 22601; Chris Thomas, 136 Blossom Dr., Winchester, VA (US) 22602

( * ) Notice: Subject to any disclaimer, the term of this patent is extended or adjusted under 35 U.S.C. 154(b) by 0 days.

(21) Appl. No.: 10/347,372

(22) Filed: Jan. 21, 2003

(65) Prior Publication Data

US 2004/0016168 A1 Jan. 29, 2004

Related U.S. Application Data

(60) Provisional application No. 60/352,595, filed on Jan. 31, 2002.

(51) Int. Cl.$^7$ ................................................. F41G 1/00
(52) U.S. Cl. ......................... 42/122; 42/123; 42/130; 42/131
(58) Field of Search ................... 42/122, 123, 130, 42/131; 33/297; 359/428

(56) References Cited

U.S. PATENT DOCUMENTS

| | | | | |
|---|---|---|---|---|
| 3,190,003 A | * | 6/1965 | O'Brien ........................ | 33/297 |
| 3,394,461 A | * | 7/1968 | Thomas ........................ | 33/297 |
| 3,431,652 A | * | 3/1969 | Leatherwood ................ | 42/122 |
| 3,540,256 A | * | 11/1970 | Thomson ..................... | 72/299 |
| 3,948,587 A | * | 4/1976 | Rubbert ....................... | 356/21 |
| 4,033,046 A | * | 7/1977 | Burris .......................... | 33/297 |
| 4,178,404 A | * | 12/1979 | Allen et al. .................. | 428/209 |
| 4,263,719 A | * | 4/1981 | Murdoch ...................... | 33/297 |
| 4,403,421 A | * | 9/1983 | Shepherd ..................... | 42/122 |
| 5,181,323 A | * | 1/1993 | Cooper ........................ | 42/122 |
| 5,223,650 A | * | 6/1993 | Finn ............................. | 42/122 |
| 5,414,557 A | * | 5/1995 | Phillips ....................... | 359/428 |
| 5,491,546 A | * | 2/1996 | Wascher et al. ............. | 356/4.03 |
| 5,920,995 A | * | 7/1999 | Sammut ....................... | 42/122 |
| 6,032,374 A | * | 3/2000 | Sammut ....................... | 42/122 |
| 6,196,455 B1 | | 3/2001 | Robinson | |
| 6,357,158 B1 | * | 3/2002 | Smith, III .................... | 42/122 |
| 6,429,970 B2 | * | 8/2002 | Ruh ............................. | 359/428 |
| 6,453,595 B1 | * | 9/2002 | Sammut ....................... | 42/130 |
| 6,516,551 B2 | * | 2/2003 | Gaber .......................... | 42/132 |
| 6,516,699 B2 | * | 2/2003 | Sammut et al. ............. | 89/41.17 |
| 6,591,537 B2 | * | 7/2003 | Smith ........................... | 42/122 |

OTHER PUBLICATIONS

"Ballistic Resources LLC Introduces The Klein Reticle©" by Ballistic Resources LLC.
Mildot Enterprises, Welcome to Mildot Enterprises About the Mildot Master® http://www.mildot.com/about.htm, 2 pp.
"Illuminated Mil–Dot Reticle," http://www.scopeusout.com/oldscopes/mil–dot.html, Mar. 25, 2002, 2 pp.
Leupold, "Reticle Changes & Target–Style Adjustments," http://www.leupold.com/tiret.html, Feb. 28, 2002, 8 pp.
Premier Reticles, Ltd., "Range Estimating Reticles," http://premierreticles.com/index.php?uid=5465&page=1791&main=1&PHPSESSID=cf5, Oct. 13, 2003, 4 pp.
Mil–Dot Reticle Scopies, "Some technical and historical information about the Mil–Dot reticle," http://swfa.com/mildot, Feb. 28, 2002, 4 pp.

* cited by examiner

*Primary Examiner*—Michael J. Carone
*Assistant Examiner*—Denise J Buckley
(74) *Attorney, Agent, or Firm*—Reed Smith LLP; Stanley P. Fisher, Esq.; Juan Carlos A. Marquez, Esq.

(57) ABSTRACT

A reticle incorporates an optical center and a plurality of measuring points. The measuring points are formed by a primary vertical line, a primary horizontal line intersecting the primary vertical line at the optical center, a plurality of dots intersecting the primary lines and evenly spaced at a predetermined distance along the primary lines, a plurality of secondary lines intersecting one of the primary lines and evenly spaced between the dots therein. The secondary lines are shorter than 0.2 mil. Alternatively, the reticle further incorporates at least one post on at least one end of the primary lines with post hash marks thereon. Each the intersecting lines forms one of the plurality of measuring points.

19 Claims, 12 Drawing Sheets

MIL.DOT RETICLE AND METHOD FOR PRODUCING THE SAME

This application claims the benefit of U.S. Provisional Patent Applications Ser. No. 60/352,595 filed on Jan. 31, 2002, the entire disclosures of which are incorporated herein by reference.

BACKGROUND OF THE INVENTION

1. Field of the Invention

The invention generally relates to a mil-dot reticle. In particular, the invention relates to a targeting reticle for firearms and the like, whereby a plurality of dots are and evenly-spaced hash-mark graduations between the dots are combined to form the reticle

2. Description of the Related Art

Figure 1:
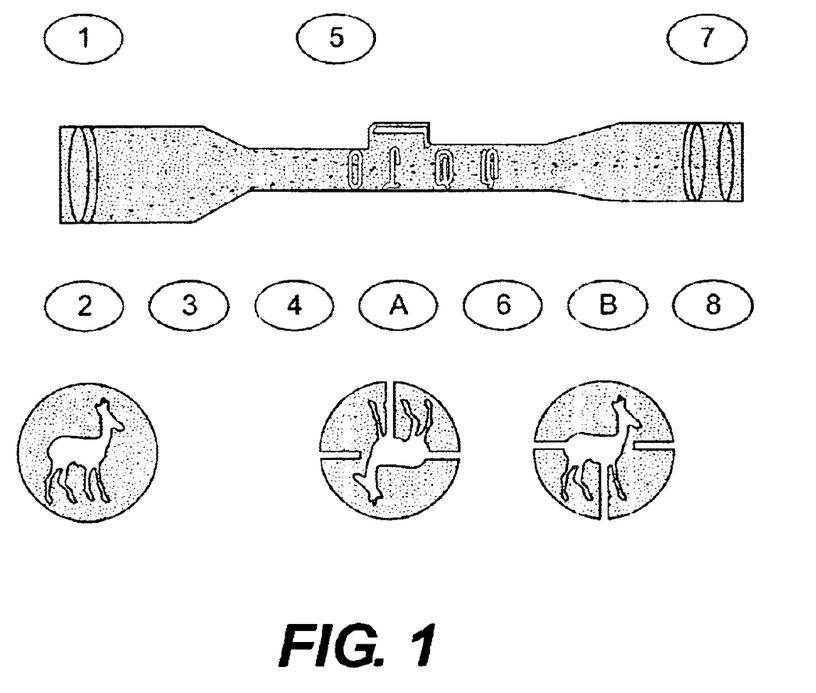
FIG. 1 shows two focal planes of an optical instrument.

A reticle is a grid or pattern placed in either of two focal planes of an optical instrument, such as a riflescope to establish scale or position. As shown in FIG. 1, the first focal plane A is between the objective lens assembly 1 and the erector lenses 6, a location where the first image from the objective 1 is projected. This image is up side down. The objective lens assembly 1 includes, typically, two or three larger lenses forming the objective lens assembly and is mounted in the objective end 2 of the optic. It is called an objective lens because it is closest to the "object" being viewed. The erector lenses 6 turn/rotate the image in the first focal plane A 180 degrees, i.e., erecting the image. The second focal plane B is between the erector lenses 6 and the ocular assembly 7. After light rays pass through the erector lenses 6, the image is projected onto this location, where the image will be seen by the user when looking in the scope from the right end 8. The reticles in the first focal plane A are sometimes referred to as magnifying reticles because appearance changes at the same ratio as the image size. Any reticle with markers off center and installed in the first focal plane A will have the same subtension (coverage on the target, i.e., spacing and size) regardless of the power setting in a variable power scope. The user can range estimate at any power and compensate for moving target leads to suit conditions. For example decreasing power allows a larger field of view and more light transmission.

Any reticle in the second focal plane B is often referred to as a non-magnifying reticle because the appearance to the eye is the same to the eye regardless of power setting in a variable power scope. Any reticle having markers off the center of the reticle will have correct spacing at only one magnification. The scope tube or housing 3 is designed to hold the various component parts. The top adjustment 5 moves the reticle so as to zero the scope can be zeroed. A second adjustment (not shown) may be place on the side of the tube at 90 degrees to the top adjustment 5.

Even though riflescopes have become increasingly sophisticated, the basic constriction has remained the same. Light rays entering the objective lens are magnified. The resulting enlarged and upside-down image proceeds through the erector lens system, which magnifies and corrects the image to the right-side-up position. Finally, the ocular lens further magnifies and projects the target image and reticle to the user's eye.

The reticle is positioned within the optical system to coincide with the plane of focus of the objective lens or lens group. In a variable power scope, as the spacing between the lenses changes, the magnification of the scope also changes. The total travel of the lenses is called the zoom ratio. Typically it would be a 3× ratio. Variable power scopes have powers specified in these ratios. For example 3.5×–10× or 2.5×–8×. Ratio is up to the manufacturer and may be anywhere between 3× and 5×.

The reticle is commonly referred to as the "crosshair," and often consists of fine wires, dots, pointed posts or other distinct shapes that appear superimposed on the first or second focal plane. In principle, relatively bold reticles aid rapid aiming, while finer reticles subtend less of the target and may be less prominent, but are conducive to precise shot placement when aiming carefully and deliberately.

U.S. Pat. No. 6,032,374 shows a telescopic gunsight with a reticle having a primary vertical line 20, a primary horizontal line 22 intersecting the primary vertical line 20, a plurality of secondary horizontal lines 24 each having a predetermined thickness and evenly spaced a predetermined distance along the primary vertical line 20, a plurality of secondary vertical lines 26 each having a predetermined thickness and evenly spaced a predetermined distance along at least some of the secondary horizontal lines 24, and a range-finder 30 positioned in one of the quadrants formed by the intersection of the primary vertical and horizontal lines. A plurality of half hash-marks (2.5 inches of angle) are placed between the secondary horizontal lines 24. The horizontal lines are asymmetrical to the optical center 21 with fewer and shorter lines on the top. The vertical lines mirror to the primary vertical line 20 with numbers 28. The range-finder 30 is placed at the lower left quadrant. The asymmetrical arrangement in conjunction with the numerous hairs complicate the reticle and can confuse the user. A plurality of horizontal half hash-marks further distract the user. In addition, the spacing between the lines is most preferably based upon the "inches of angle" scale rather than the "minute of angle" scale or Mil Radian scale, which have been adopted by the military for years.

Radians are used in a coordinate system called "polar coordinates." The radian is a unitless measure which is equivalent, in use, to degrees. It is an angular measure equal to the angle subtended at the center of a circle by an arc equal in length to the radius of the circle, approximately 57° 17'44.6"0.2π radians=360 degrees. A point on the plane is defined, in the polar coordinate system, using the radian and the radius. The radian defines the amount of rotation and the radius gives the distance from the origin (in a negative or positive direction).

Switching from the "degree" mode to the "radian" mode, one milliradian=$\frac{1}{1000}$ (0.001) radians in the mil-dot reticle. The mil-dot reticle, which was designed to help U.S. Marine Corps snipers estimate distances, became standard for all military branches. All mil-dot reticles in current use have 10 mils space vertical and horizontal. The mil-dot reticle does not limit the user to one size or a limited number of sizes. The mil-dot reticle is now also the standard reticle found in law enforcement riflescopes. It has been adopted over the years by sportsman and hunters as a serious aid for range estimating. The mil-dot reticle is a reliable means for determining distances to targets, establishing leads for moving targets, and for alternating aiming points for windage and elevation considerations. Military snipers who have been trained in formal instruction programs spend numerous hours honing their ability to use the mil-dot reticle so as to be comfortable and competent with it. In contrast, some civilian tactical and practical long-range precision shooters are hesitant of the mil-dot reticle because of a lack of proper training. Aids available for the proper use of the mil-dot reticle include a simple formula that can be used with a calculator, mil tables or a slide rule type calculator called the MILDOT MASTER™. This calculator can be found at this link http://www.premierreticles.com/mildotmstr.htm.

The mil-dot reticle is designed around the measurement unit of the milliradian. The dots and the spacing of the dots are also designed based upon the milliradian. The space between dot centers subtends one milliradian(mil). This allows a shooter to calculate the distance to a target of a known height or width. For example, the height of the target in yards divided by the height of the target in milliradians multiplied by 1000 equals the distance to the target in yards. The height or width of the target has to be known to use this system effectively. A milliradian is an angular unit of measure that equals one yard at 1000 yards and 1 meter at 1000 meters. The distance to a target can be decided when the size of the target is known. The shooter simply measures the target using the dots, then uses a simple formula to obtain the target's distance or the distance to an item near the target. For example, if the top of the head of a 6-foot-tall man (2 yards) is lined up with one dot and his feet are lined up four dots down, he is (2/4)*1000=500 yards away. The same technique can be used to estimate a lead on a moving target or to compensate for deflection on a windy day. A conversion table with ½ increments is available at http://www.swfa.com/mildot/, and a conversion table of ¼ increments is available at http://www.premierreticles.com/images/milchtyds.gif. As shown in the first site, the length of a dot is ¼ mil such that the mil estimate can be further split to the nearest ⅛ mil. for a more accurate range measurement. However, no actual mil scale mark of ½ mil has been provided.

U.S. Pat. No. 6,196,455 shows a hand-held mil-scaled calculator apparatus and a method for using the same in the field in association with firearms. The apparatus permits the user of a high-powered rifle equipped with a telescopic sight having a mil-dot reticle to quickly determine the range to target and the necessary elevation adjustment to compensate for bullet drop. However, its hash-marks (the first embodiment in FIG. 1 and the second embodiment in FIG. 9 of the patent) are unevenly-spaced.

The size, shape and spacing of the lines and mil-dots are extremely useful for measuring the target. The website at http://www.leupold.com/products/reticles.htm lists many commercially available reticles, including mil-dot reticles with evenly-spaced round dots which are symmetric to the optical center. The mil-dot reticle pattern shown at the website http://www.swfa.com/mildot/, manufactured by the applicant Premier Reticles, Ltd., is made up of the same number of horizontal and vertical dots placed on a cross hair. They are applied wet to a fine wire and appear oval because of the surface tension of the material drawing the dots into an oval shape when added to the wire. Mil-dot reticles made from fine wire are termed "mechanical". They are ¼ mil. long (0.86 MOA) and 7/16 MOA narrow. The term "minute-of-angle" (MOA) is used regularly by target shooters (one MOA is about 1" at 100 yards). If the rifle is shot 5 times into a 100-yard target and every shot went into an one-inch circle, then the rifle could be said to shoot 1 MOA. Likewise, if every shot goes into a two-inch circle at 200 yards, it shoots 1 MOA. A 10-inch group at 500 yards would be 2 MOA.

Reticles can be made with two other methods. One method is etching a reticle with a foil approximately 0.0015" thick. This foil is photographed and then acid etched. The acid removes all but the remaining reticle design that was photographed. A second and more common method is a chrome-filling process to provide a glass reticle. Glass reticles are approximately 1–2 mm thick and are sized on the outside diameter to fit within the optical system. An image is photographed on the surface, acid etched and then chrome filled. It is also possible to laser mark the glass and then chrome fill the reticle pattern. Alternatively, a glass reticle is produced by applying a chrome image directly onto the glass.

Figure 2:
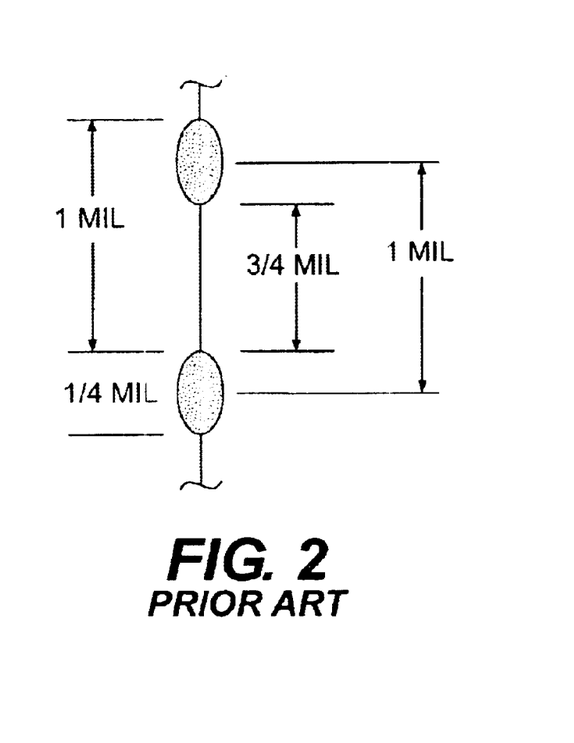
FIG. 2 shows a ¼ mil oval dot according to the prior art.

The current designs of mil-dot reticles have dots that are of either the following two sizes via the above-mentioned methods. The mechanical wire mil-dot reticles prevent retro-reflection caused by the glass, while these mechanical dots applied to fine wire are always oval, such as some supplied by Leupold®, http://www.swfa.com/mildot/having oval dots of ¼ mil long (0.86 MOA). Unless a dot is installed at the intersection of two lines, it will always be oval-shaped by applying the traditional mechanical painting method. Another dot size is a round dot with a ¾ MOA (0.22 mil) diameter, such as those offered by Leupold in some of their scopes, including the illuminated scopes and Mark 4 scopes. These designs do not allow the mil increments to be broken down into 0.1 mil increments. The ¼ mil oval dot as shown in FIG. 2 can only be broken down into ¼ mils but with difficulty. It would be impossible to find any 0.1 mil increments in a prior art reticle because 0.25 is not divisible by 0.1 and it would take a lot of extrapolation to estimate anything smaller than ¼ mils.

The KLEIN reticle has 0.1 mil radius round dots and evenly-spaced hash-mark gradients placed between the dots such that the shooter can speculate the nearest 0.2 mil. The hash-mark gradient is in the KLEIN reticle are 0.4 mil which over powers the 0.2 mil diameter dots, and its post width is also 0.4 mil. The KLEIN hash marks are only 0.035 mil thick which is hard to see at lower powers, such as under 10×. In addition, the KLEIN reticle only provide bare posts.

Currently, there is a demand for a mil-dot reticle with 0.2 mil round dots and shorter evenly-spaced hash-mark gradients placed between to improve ranging accuracy, and there is also a demand for better designed posts to improve ranging efficiency.

SUMMARY OF THE INVENTION

It is a purpose of this invention to provide a mil-dot reticle to assist a shooter to produce more accurate and repeatable results.

It is another purpose of this invention to provide a plurality of mil-dots with half mil hash-marks between the dots on a reticle.

It is still another purpose of this invention to answer to persistent requests from various military and law enforcement operators for a more user friendly and accurate mil-dot reticle to be applied to variable power scopes or optical assemblies for amplifying a distance object, such as telescopes, binoculars, spotting scopes, shooting scopes, etc. The second request is to increase the versatility of the ranging capability to allow range estimating for larger objects at closer distances. The current design mil-dot reticle has up to 10 mils of space. For example a 25 foot object could be estimated from 833 yards to 8333 yards with the existing 10 mil increment mil-dot reticle. Adding 5 mil increment markers out from center greatly increases the ranging capability for larger objects. If when ranging the 25 foot object fills 50 mils the distance is 167 yards. The end result is a ranging capability from 167 yards to 8333 yards. These extra markers also allow a military forward observer to direct placement of artillery and mortar rounds.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DESCRIPTION OF THE PREFERRED EMBODIMENTS

Figure 3:
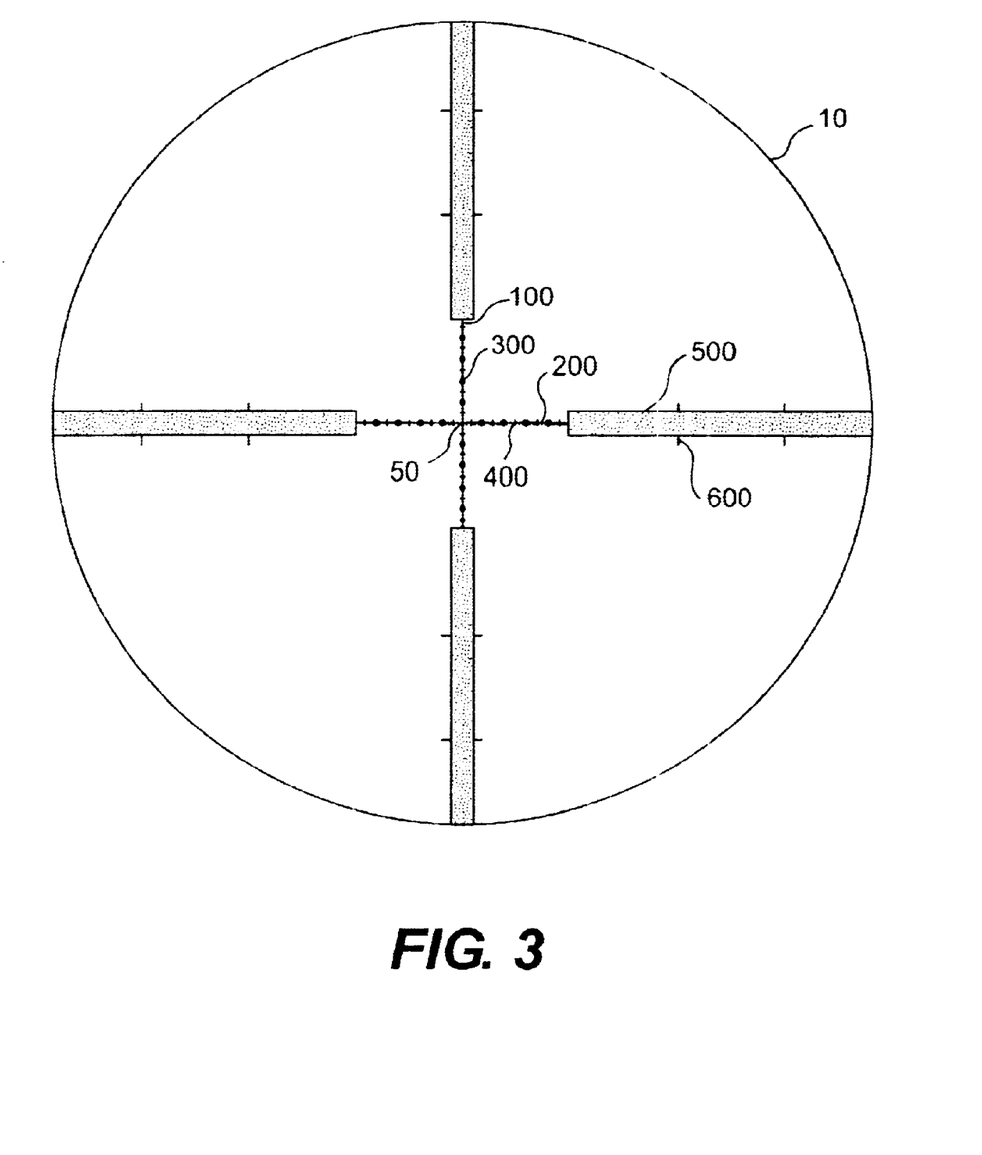
FIG. 3 shows a shooter's prospective on the mil-dot reticle for a shooter's scope according to the present invention;.
Figure 4:
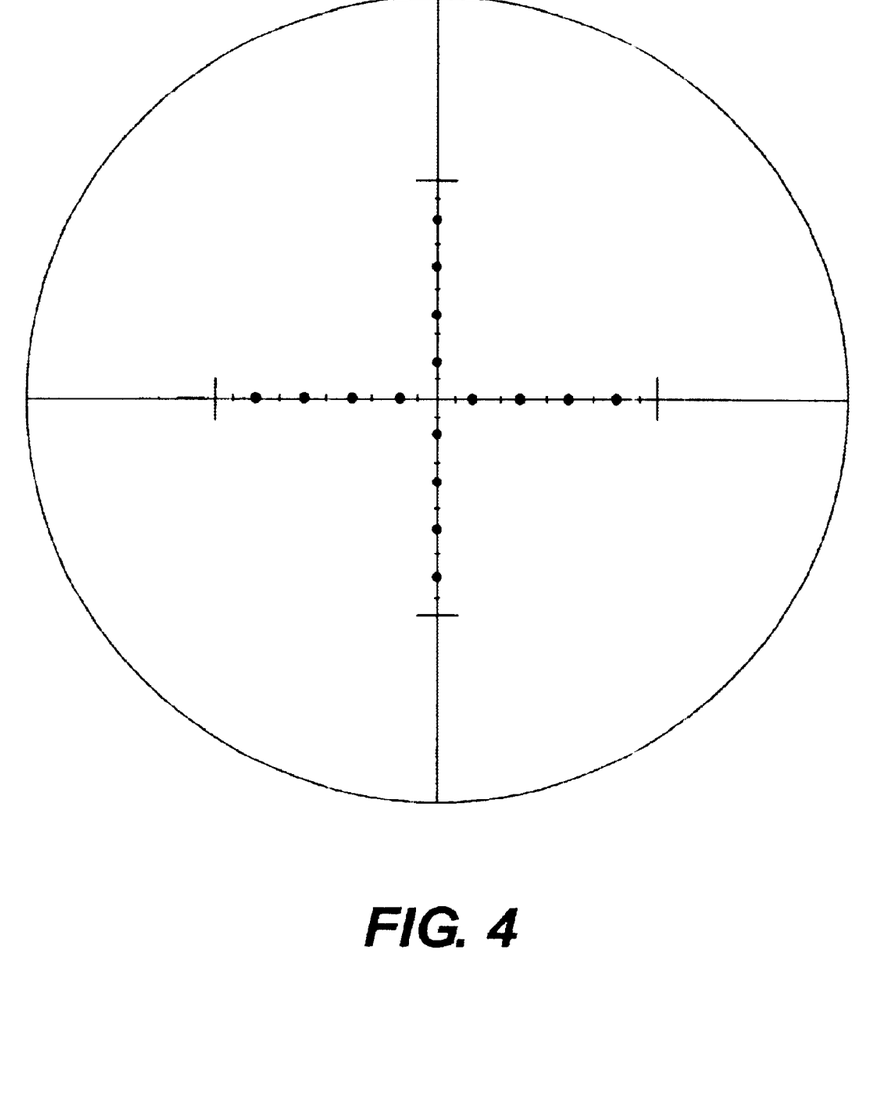
FIG. 4 shows a spotter's prospective on the mil-dot reticle for a spotter's scope according to the present invention.

With reference to the figures, like reference characters will be used to indicate like elements throughout the several embodiments and views thereof. FIG. 3 shows a shooter's perspective on the mil-dot reticle for a shooter's scope of the present invention. A reticle 10 comprises an optical center 50 and a plurality of measuring points, the measuring points formed by a primary vertical line 100, a primary horizontal line 200 intersecting the primary vertical line at the optical center 50, a plurality of dots 300 intersecting the primary lines 100, 200 and evenly spaced at a predetermined distance along the primary lines 100, 200, a plurality of secondary lines 400 intersecting one of the primary lines and evenly spaced between the dots 300 therein. Each interaction of the intersecting lines forming one of the plurality of measuring points. The reticle 10 further comprises posts 500 each at one end of the primary lines 100, 200. FIG. 4 shows a spotter's scope, at the maximum power setting, which is basically the same as the shooter's scope except for the posts. The posts are omitted to provide a wider view for the spotter. Pairing a rifle scope with a spotting scope having the same basic design allows the two man shooting team to speak the same language when using reticles. The working relationship between a shooter and a spotter will be discussed later. By analogy, the posts are utilized when installed in rifle scopes but not necessarily in binoculars or spotting scopes. The spotting scopes may have a laser designator mounted on top to be used to "paint" or mark targets.

Figure 7:
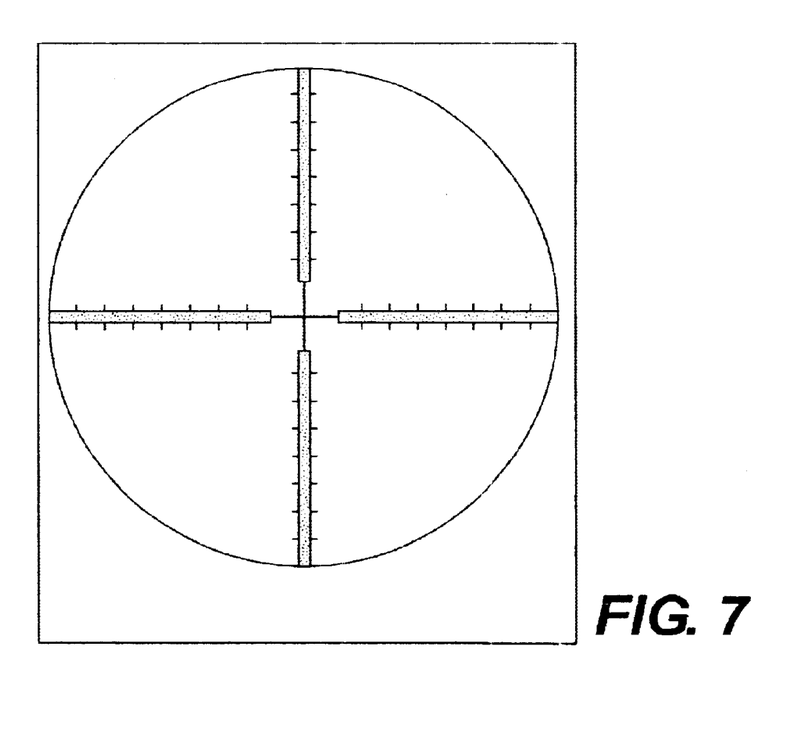
FIG. 7 shows the respective magnifying reticle field of view at 3.5× of the same 3.5×–10× rifle scope in FIG. 6.

The mil-dot reticle 10 in FIG. 3 is a glass reticle with dots spaced 1 mil apart on the wires (i.e., the primary lines 100 and 200) and 10 mils (milliradians) between opposing posts 500. Each post is 1 mil wide and has seven 2-mil long post hash marks 600 spaced 5 mils apart (FIG. 7). The addition of hash marks on the posts allow range estimating on larger size objects at closer distances. The 1 mil wide post and 2 mil long post hash marks on the reticle provides convenient estimate references in a low power setting as showing in FIG. 7. More of the reference markers are visible at low power compared to high power. Although most of the reference marks are visible through out the power range of the optic. In comparison, the Klein post width is 0.4 mils which is visible but difficult to see at powers under 10×.

Figure 5:
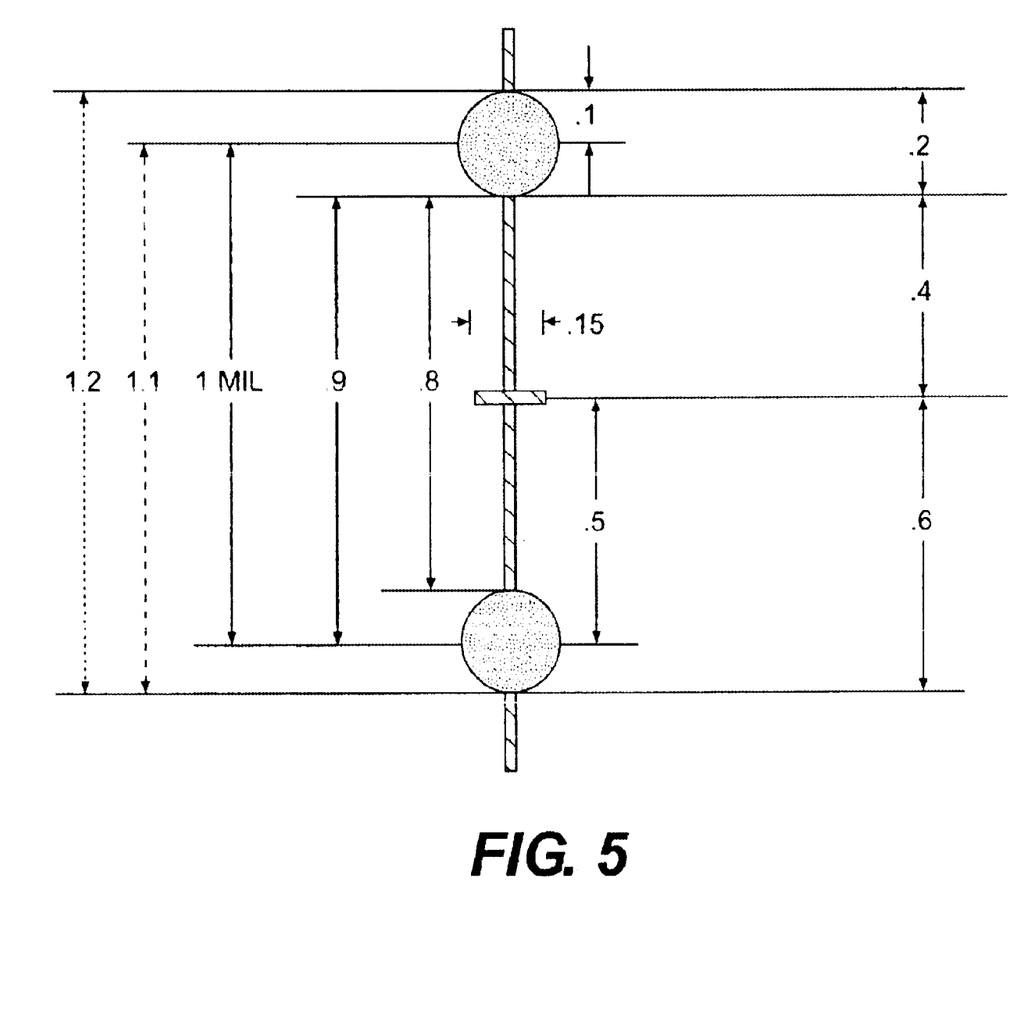
FIG. 5 is a an enlarged view of one hash mark between two 0.2 mil diameter dots.
Figure 6:
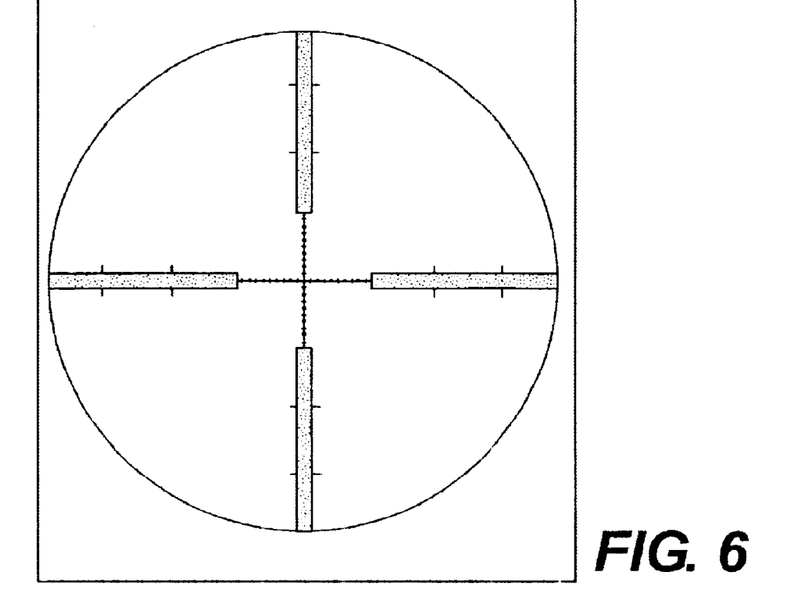
FIG. 6 shows the magnifying reticle field of view at 10× in 3.5×–10× of a rifle scope and a non magnifying 10× mil-dot reticle of the invention applied to the second focal plane

The number of mils between neighboring hash marks 5 is arbitrarily selected or based upon the market demand. The dots 300 are sized to be exactly 2⁄10 mil round in diameter. This allows mils to be broken into 1⁄10 mil increments. The addition of ½ mil apart hash marks and the 0.2 mil diameter dots allows a 0.2 increment and 0.1 mil estimate on the reticle, especially in a high power setting as shown in FIG. 6. FIG. 5 is a an enlarged view of one 0.15 mil long and 0.061 mil thick hash mark between two 0.2 mil diameter dots. All 0.1 mil dimensions can be found on the reticle except for 0.3 mil and 0.7 mil. The 0.1 mil increments increase the ranging accuracy of the reticle which is one of the key purposes of the invention.

The hash mark is 0.15 mil long such that it will not over power the 0.2 mil dots. A shorter than 0.2 mil hash mark allows the appearance of the dot to be the most predominant feature to the eye within the center part of the reticle. Otherwise, the eye gets confused when looking at the same sizes. The 0.15 mil dimension was arbitrarily chosen based on appearance, which could be longer or shorter than 0.15 mil but shorter than 0.2 mil.

The 0.061 mil hash mark thickness keeps the hash marks visible in different power settings. The thickness of the hash marks and crosshair is determined by three factors: 1) not too small to see; 2) not too large to be overpowering to the eye or to subtend too much on the target; and 3) the magnification of the optic it is installed. The exact thickness dimension is determined by the magnification of the optic it is installed in using the first two criteria. For example, if installed in the first plane of a scope with a magnification of 8.5×–25×, the thickness of the hash mark and crosshair would be as small as 0.022 mil since the reticle at 25× appears 2.5× bigger. By analogy, the hash mark is 0.09 mil thick in a 2.5×–8× first plane scope, 0.05 mil thick in a 4.5×–14× first focal plane scope, and 0.026 mil in a 6.5× –20× first focal plane scope. Each of the post is 1 mil wide for a 3.5×–10× or 4.5×–14× scope, 1.25 mil for a 2.5×–8× scope, 0.75 mil, and for a 6.5×–20× or 8.5×–25× scope. Each hash mark on a post is 2 mil long for a 3.5×–10× or 4.5×–14× scope, 2.5 mils for a 2.5–×8× scope, and 1.5 mils for a 6.5×–20× or 8.5×–25× scope.

The posts are 1 mil thick. The hash marks 600 on the posts 500 are 2 mils in over-all length and placed in 5 mil increments to extend entirely to the edge of the field of view (in each direction). Two hash marks, per side, are visible at 10× and 7 hash marks, per side, when viewed at 3.5×. This feature can be utilized when ranging larger objects at closer distances. The number of 5 mil increment hash marks depends on the power setting of optic. In a high power setting, less hash marks show, while in a low power setting, the maximum number of hash marks may become visible.

The above-discussed marking dimensions are based upon the condition of installing the reticles being in the first focal plane. Dimensions and comparisons differ if the reticles are installed in the second focal plane of a variable power scope at only one power or if installed in a fixed power (non variable power) scope. For example, the invention can be installed in a fixed power 10× and 16× scope or in a variable power scope, such as 4.5×–14×, 6.5×–20× or 8.5×–25×, that could be set at 10×. These power ranges are arbitrarily selected or based upon the market demands. The exact scope and power setting determines visible dimensions of the hash marks. For example, in 3.5×–10×, the post width is 1 mil (in second focal plane 10× setting scopes), but 1.25 mils for use in the 2.5×–8× scope. The dimensions and sizes should be determined to give visibility under low light and at lower powers.

Installed in the variable power scopes set at different powers, the number of visible 5 mil hash marks varies with magnification. Some of the hash marks may be visible out to the edges of the field of view, when the invention is applied to a scope with variable magnification. A low magnification optic gives a larger field of view than a high magnification one. The corresponding field of view (FOV) determines number of viewable hash marks. For examples, a 2.5×–8× rifle scope in FIG. 6 has about 112 mils of FOV at the lowest power setting at 100 yards, while a 12×–40× power spotting scope at 40× in FIG. 7 has only 19 mils FOV. Therefore, only one extra 5 mil hash marks visible at the right and left sides of the center on the high power scope. At 12×, the FOV of the spotting scope shows four extra 5 mil hash marks. When the lower powered rifle scope is set at its lowest power (2.5×), nine hash marks per side are viewable. Based on current demand of optics with powers from 2.5× to 40×, number of hash marks visible would be from nine per side to one per quadrant.

This mil-dot reticle of the invention maintains the mil spacing and components of the reticle constant throughout the power range of the variable scopes when it is installed in the first focal plane A. The beauty of the reticle 10, FIG. 3, in the first (rather than second) focal plane of the 2.5×–8×, 3.5×–10×, 4.5×–14×, 6.5×–20× and 8.5×–25× is the versatility to the user. As mentioned, any reticle, including the reticle 10, installed in the first focal plane of a variable powered optic will have the same subtension (coverage on the target) regardless of power setting.

Figure 8:
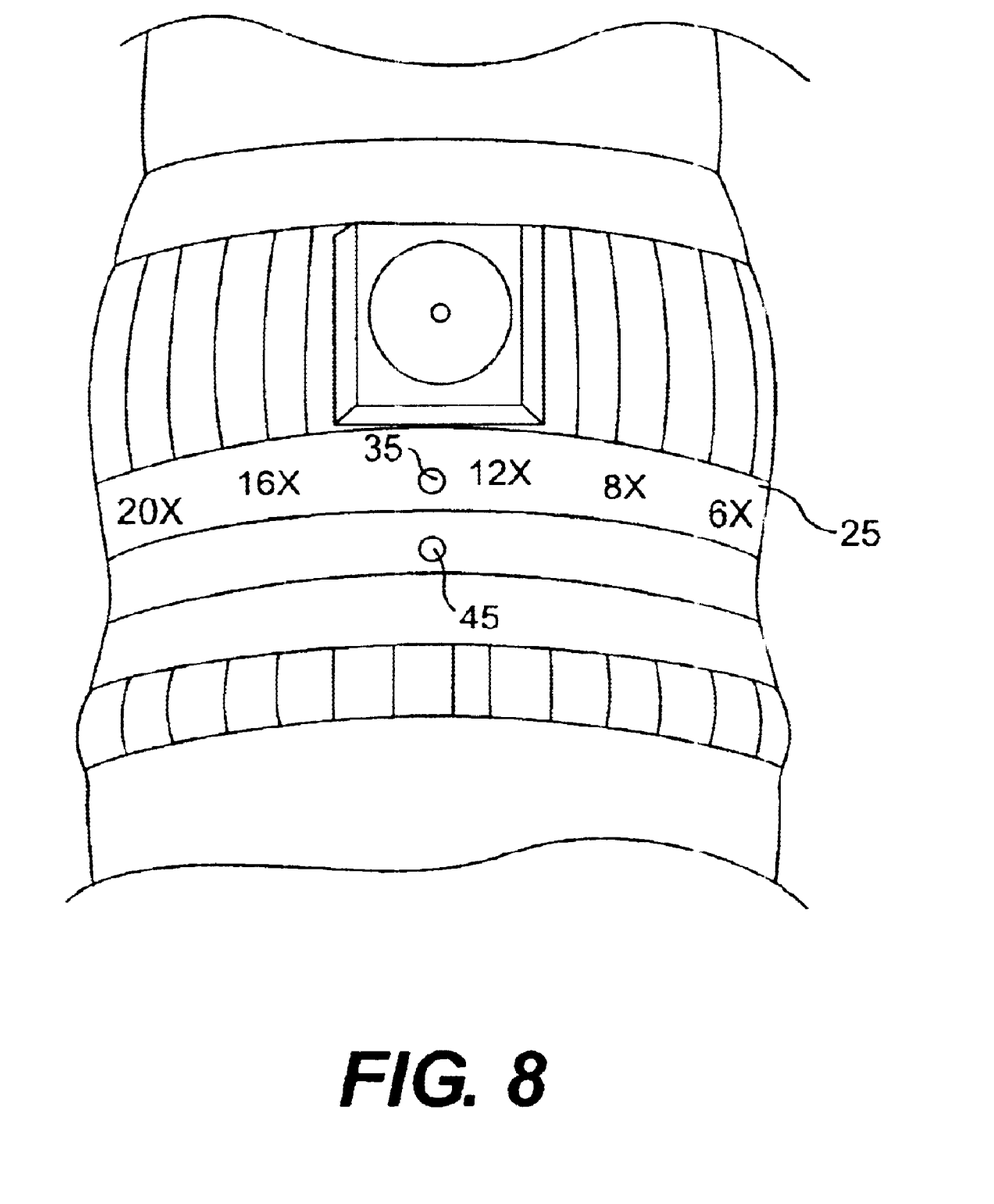
FIG. 8 showing the witness mark and the power ring selector relative to the reticle.

This mil-dot reticle may also be installed in other variable power scopes, such as 4.5×–14×, 6.5×–20× and 8.5×–25×, in the second focal plane. A 10× mil-dot reticle of the invention can be installed in these scopes, and its power shall be set at a witness mark on its power ring selector to ensure a correct mil spacing. The dot 45 in FIG. 8 is used as a reference mark to turn a power ring 25 to set a specific power (magnification) setting of the scope. The dot 35 to the left of the 12× is a witness mark. When the two dots are aligned, the reticle in a second focal plane reticle will have 1 milliradian spacing. These-power ring reference numbers usually are not accurate. The power ring 25 are collimated with the reticle in the scope so as to adjust the power to the 1 mil spacing. The witness mark 35 is then machined on the power ring 25. In a first plane reticle, a witness mark or indicator represents the proper power setting, while in a second focal plane reticle, it assures a 1 mil spacing.

The mil-dot reticle of the invention is not limited to variable power scopes, but can be installed in 10×, 16×, or other fixed power scopes. In these embodiments, the reticle intersection 50 is left without any dot to avoid obscuring the aiming point. However, such a dot superimposed over the optical center may be available in another embodiment of the invention.

As mentioned, a milliradian or "mil" is an angular unit of measure that equals one yard at 1000 yards and 1 meter at 1000 meters. The distance to an object can be decided when the size or dimensions of the object is known. The shooter simply measures his target using the dots, then works a simple formula as follows to obtain the target's distance or the distance to an item near the target:

Height of item in yards (meters)×1000/Mils read=Distance to item in yards (meters)

Knowing the sizes of items being measured is a matter of knowing the prospective area of operation and generating a list of the sizes of standard or commonly found objects within the area of operation. It is not limited to just one size. Any dimension for the object can utilized. Knowing both a height and a width of a target helps to estimate both dimensions. Military soldiers usually know the sizes of enemy vehicles, enemy weapons, average heights of soldiers, etc. A law-enforcement sniper usually know the sizes of traffic signs, building elements, civilian and commercial vehicles, etc. Civilian users, such as sportsmen, hunters, estimate distance using the mil-dot reticle if the user knows object or animal size.

Beside use as a ranging tool, the mil-dot reticle can be used to establish alternate aiming points for moving targets, elevation/windage hold-offs and quick follow-up shots.

The importance of being precise on the range readings becomes evident when working at a long range. Answering to persistent requests from various military and law enforcement operators, hash marks are provided between the mil-dots according to the invention to provide ½ mil gradients which allows much more accurate range estimating. This also gives a more precise aiming point when using the mil-dot for quick hold-overs. ½ mil gradients are 0.15 mil in length. This 0.15 mil dimension keeps these ½ mil increment hash marks from competing with the 0.2 mil round dots. It is much more pleasing to the eye and keeps the appearance simple. The hash-marks between the mil-dots are especially helpful when dealing with small items, such as vehicle wheels, small stickers on windows, headlights, etc. They also allow more accurate range estimating. The dots are spaced precisely 1 mil apart which represents 3.6 inches at 100 yards at specified power. This mil-dot design is manufactured on glass.

Figure 9:
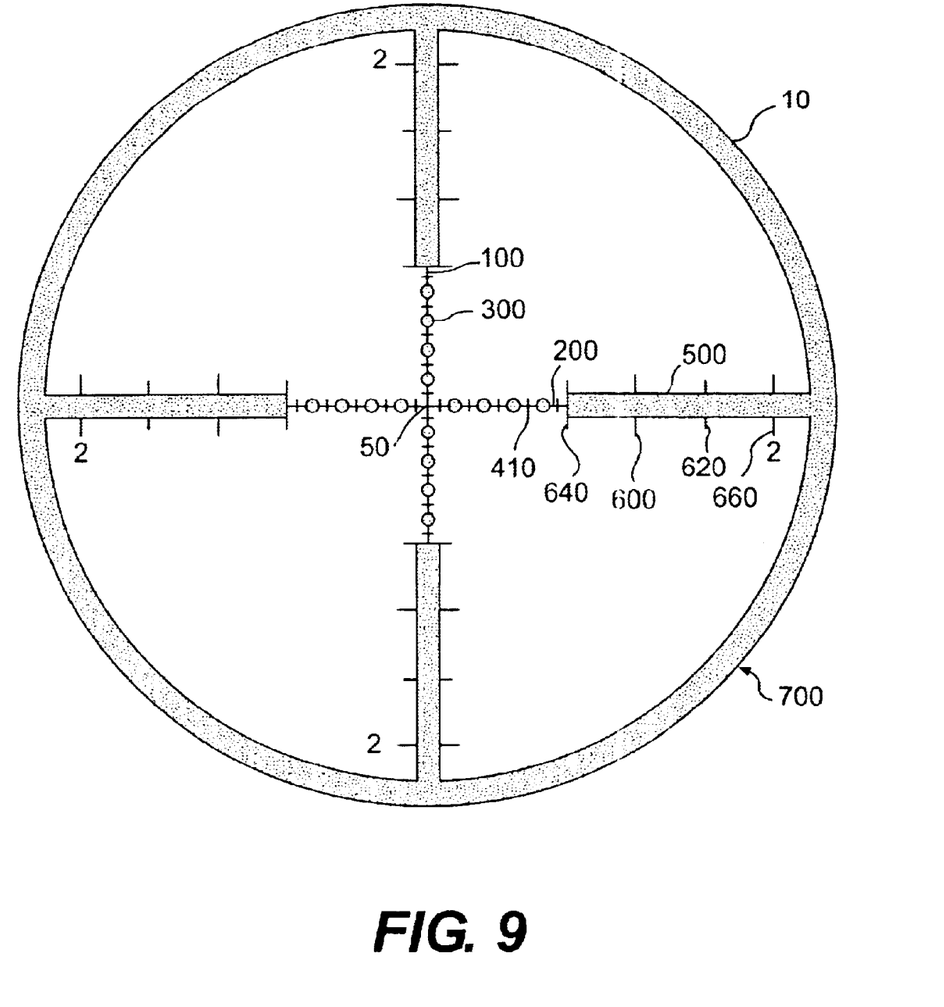
FIG. 9 shows the second embodiment of the invention in a 2.5×–8× rifle scope at maximum power.
Figure 10:
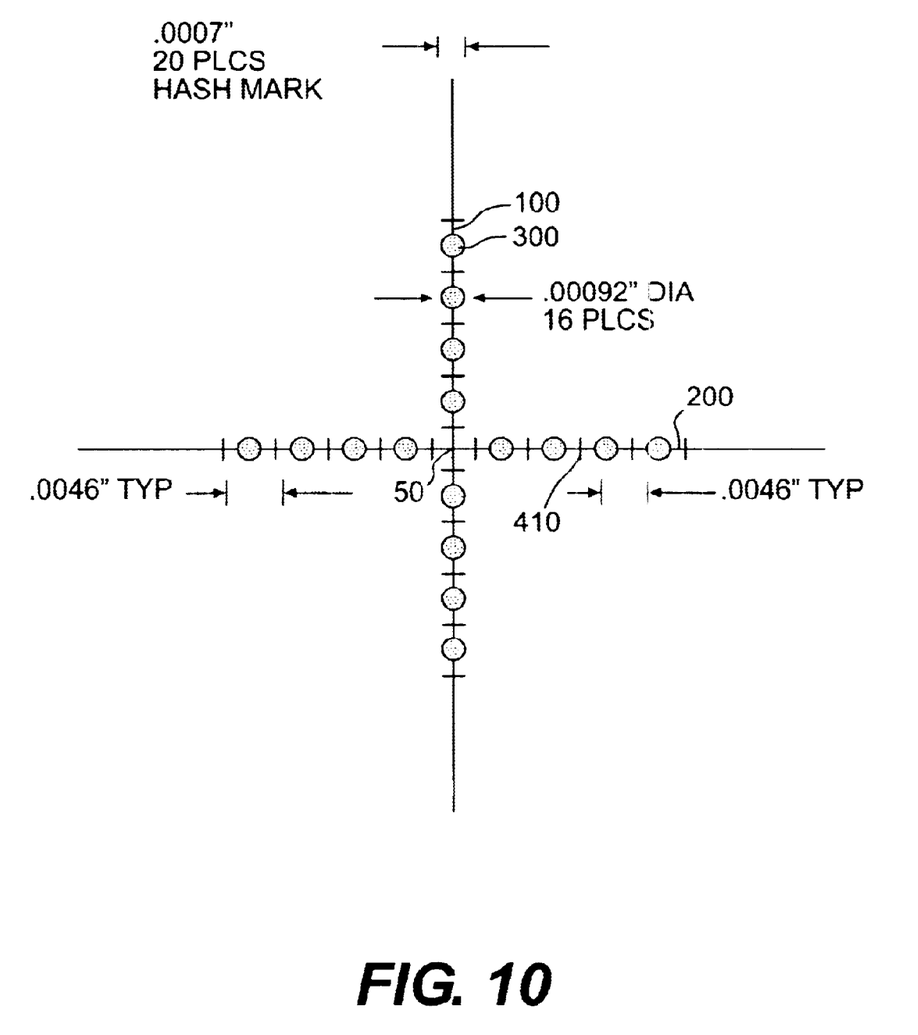
FIG. 10 shows the enlarged view of the hash marks of 0.15 mils long on the primary lines in FIG. 9.
Figure 11:
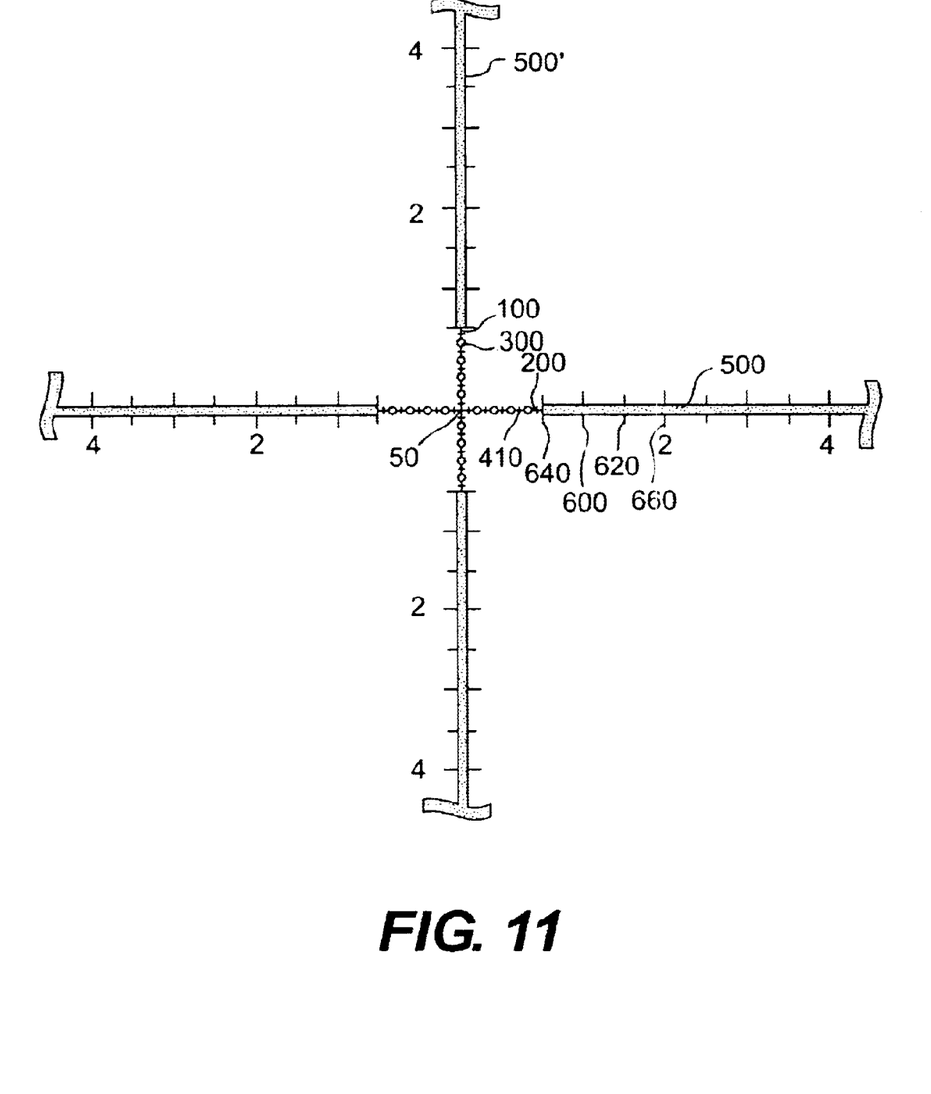
FIG. 11 shows a larger size variation of the embodiment in FIG. 9 but at 2.5× power.
Figure 12:
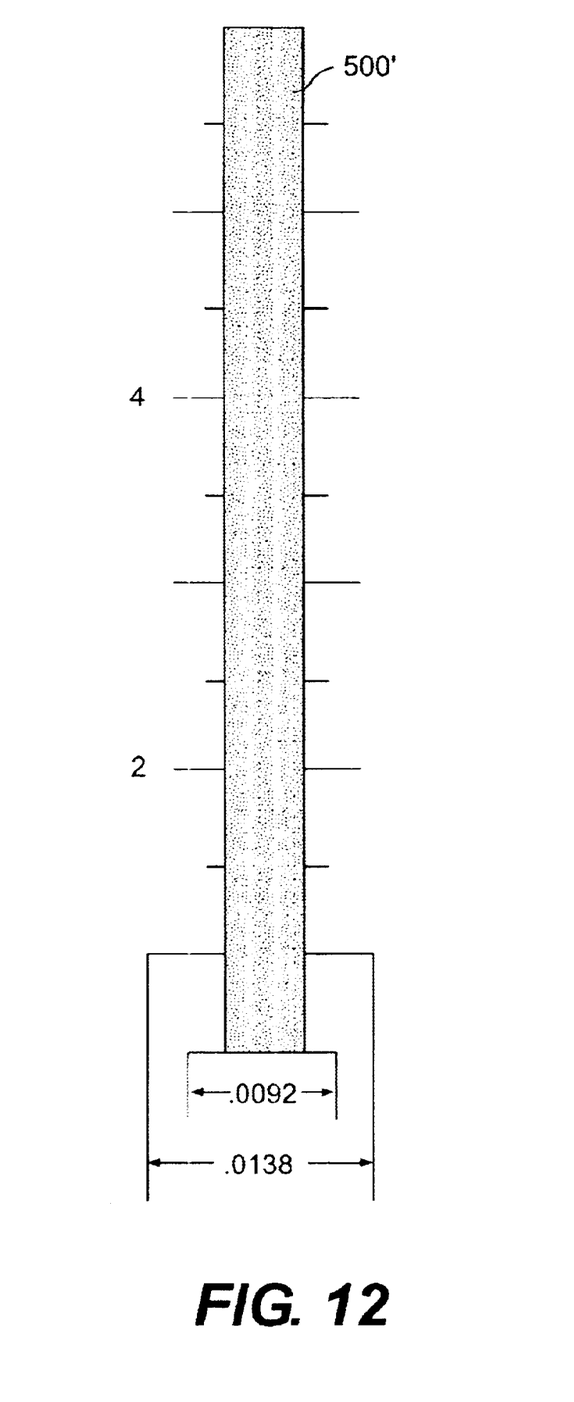
FIG. 12 shows an enlarged view of one post in FIG. 11.

FIG. 9 shows the second embodiment of the invention at 8× in a first focal plane 2.5×–8× rifle scope, which is similar with the first embodiment in FIG. 3 but with (1) hash marks 410 of 0.15 mils long on the primary lines 100, 200, (2) a ghost ring 700 around the reticle, and four posts each having (i) an end hash mark 640 connecting with the primary line 200, (ii) hash marks of different widths, such as 600 vs. 620, and (iii)reference number "2" for the last hash mark 660 on each post. FIG. 10 shows the enlarged view of the hash marks 410 of 0.15 mils long on the primary lines 100, 200. Shows 0.2 mil dots 300 on primary lines 100, 200. For the same reticle at 2.5×, reference number 4. is added (FIG. 11). FIG. 12 shows an enlarged view of one post 500' in FIG. 11.

For low light considerations, all lines and hash marks are ¼ MOA (minute-of-angle) for maximum visibility in a 3.5×–10× scope and 0.32 MOA in a 2.5×–8× scope. Other subtensions may be 0.18 MOA in a second focal plane variable power scope at 10× or a fixed power 10× scope. In a 16× scope, crosshair subtension is ⅛ MOA with $^{9}/_{10}{}^{th}$ mil posts. All sizes are determined to provide the best appearance to the eye. Using this reticle installed on the first focal plane in any variable power scope set at 8× provides optimum light transmission giving an 5 mm exit pupil (40 mm objective lens) and maintains mil spacing, comparing with a second focal plane 10× reticle intended to have mil spacing at only 10×.

Figure 13:
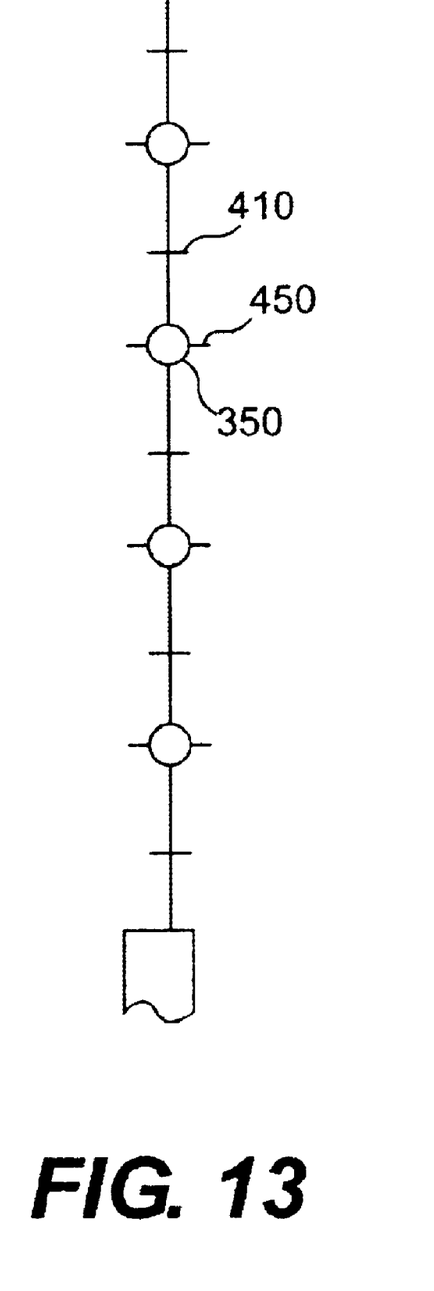
FIG. 13 shows a third embodiment of the invention having the hollow dots with ½ mil hash marks.
Figure 14:
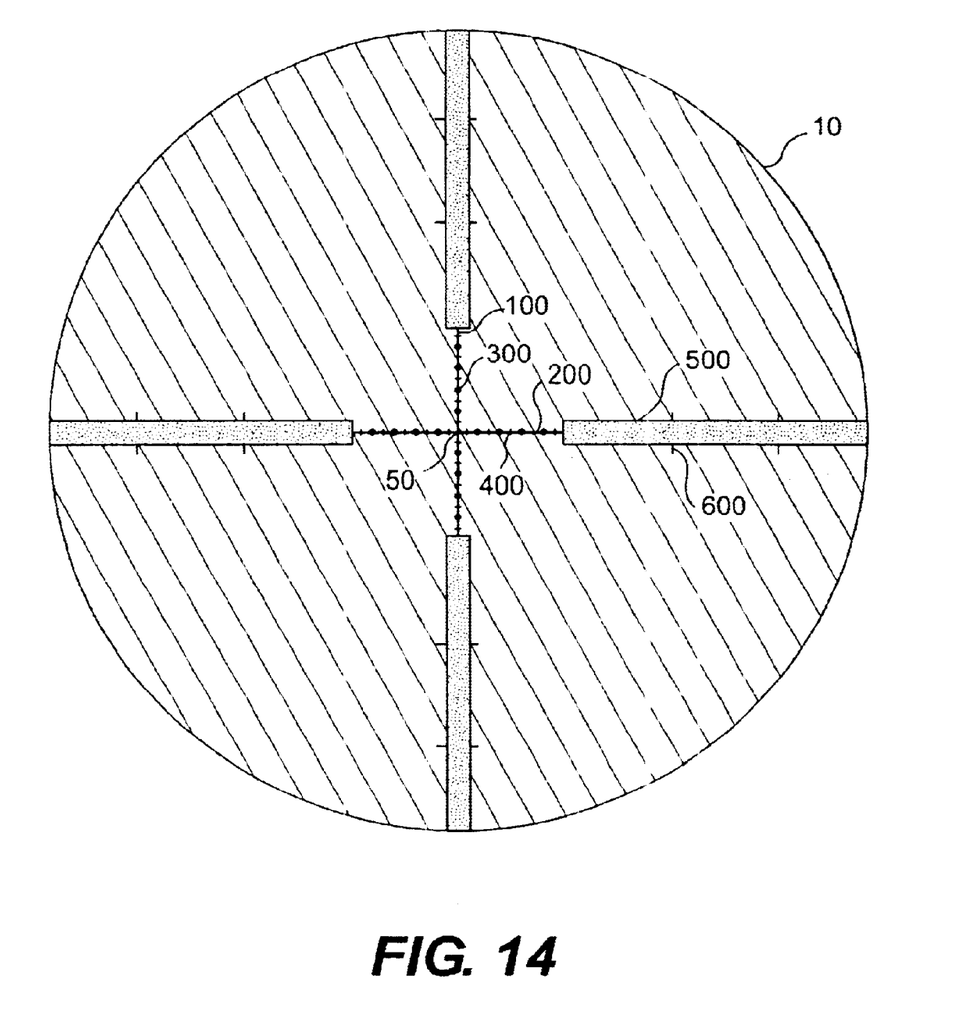
FIG. 14 shows the reticle in FIG. 3 illuminated with a green light according to the invention.

An illuminated mil-dot reticle provides a distinct aiming point in extreme low-light situations. FIG. 14 shows the reticle in FIG. 3 illuminated with a green light which comes from a LED light source. The color is determined by LED color which does not limited to green. Without illumination, the reticle design appears black as in FIG. 3. FIG. 13 shows a third embodiment of the invention having the hollow dots 350 with ½ hash mark ears 450. Each ear 450 attached to the hollow dots may be 0.15 mil long and as thickness as the hash mark 410. Each hollow dot 350 has a 0.2 mil inside diameter which allows illumination light to pass through. Alternatively, the whole or a portion, such as the center, of the reticle can be illuminated with a battery powered light source.

In addition to the well-defined black reticle shown in FIG. 3, the half mil hash-marks of the present invention can also be adopted in illuminated reticles available at http://www.scopeusout.com/oldscopes/mil-dot.html at an extra cost. The dot subtensions on this web site show outside diameter of 0.25 mil with 0.125 mil inside diameter. While it is possible to make a hollow dot reticle, the inside diameter is so small it is not practical. Having a ¼ mil diameter does not allow increments to be broken down into 0.1 mil, the same drawback as the one of the oval ¼ mil dots previously mentioned. If the dot is made larger outside to increase inside diameter, it is impossible to break the mil-increments down into 0.1 mil as the invention as shown in FIG. 5.

In another embodiment of the invention, rather than the solid black dots, the mil-dots can be coated with opaque materials which emit fluorescence or reflect light from an external source, etc. In addition, all four posts can also be transparent with a border line to be see through such that the target is less obscured. These features may enable the shooter to more accurately estimate the range to his target. The reticle glass can be etched to glow red or illuminated with a light of another color at different intensities. This flexibility ensures sufficient contrast in low light when the reticle is illuminated.

Most American variable power scopes or optical assemblies for amplifying a distance object, such as telescopes, binoculars, spotting scopes, rifle scopes, etc., do not magnify the reticle along with the target. The reticle remains the same size as the target image zooms. However, for those scopes magnifying the reticle along with the target, knowing what magnification setting the scope is set up to use the reticle dots is critical to getting accurate readings. Most of these scopes are set up to use their highest power setting and some have an index mark on the power ring.

The mil-dot reticles of the invention may be calibrated to be used at one magnification. For example, if the scope is 3.5×–10× the correct magnification is 10×. On the 4.5×–14× scope, a magnification of 14× is used. Reticles installed in 6.5×–20× or 8.5×–25× are intended to be used at 10× for proper 1 mil spacing. The use of any other magnification will give inaccurate results. These reticles are installed in second focal plane. The embodiment installed in the first focal plane according to the invention was custom-designed for 2.5×8×, 3.5×–10×, 4.5×–14×, 6.5×–20× and 8.5×–25× duplex scopes sold under the trademark Leupold®.

The invention also provides a method for using the above-discussed mil-dot reticles. For example, in the military, two soldiers shoot as a team, one as the shooter and one as the spotter. This team functions as one unit with each member having specific duties and responsibilities on which the other relies. The shooter is responsible for the rifle, optics and supporting shooter equipment to be used in conjunction with operating the rifle. The spotter is responsible for all mission supporting equipment, such as the radios, binoculars, spotting scopes, etc. The mission specific equipment, such as thermal sights, video/photography equipment, etc., would be handled by the two soldiers together. The shooter selects and establishes the best firing position. Once the shooter is in position, the spotter positions oneself as close as possible on the shooter's finding side with the spotter's head about even with the shooter's shoulder. This position allows the spotter to look down the line of bore and facilitates better communication. In this position, the spotter is in an ideal position to look into the chamber of the weapon in case of a malfunction, to observe all of the shooter's actions, and to see what is on the optics. The situation, environment and terrain will dictate the team's actions to establish the shooter's position. Nevertheless, both the spotter and the shooter have the capability to range estimate when using a mil-dot reticle.

After the team has established their positions and drawn a terrain sketch, they conduct a detailed search of the objective area. This is done slowly and deliberately using the riflescope, binoculars and the spotting scope. The shooter's rifle is equipped with the mil-dot reticle to determine the range to a target. The shooter uses a formula similar to the above-mentioned formula but associated with the specific riflescope. The formula is "size of target height or width in yards then divided by the size of the target in mils as determined with the mil-dot scope gives the distance in yards. When determining distance in meters height or width of object (in meters) times 1000 and then divided by the size of the target in mils give the distance in meters" The shooter must know the size of his target and accurately determine it's relational size in using the rifle's specialized scope. Once the shooter determines the target's range, the shooter adjusts the scope for elevation. Improper range estimation, being as little as 20 meters off, can result in a missed opportunity and a failed mission. As such, the hash-marks provided between the dots can significantly improve the accuracy of range calculation by allowing spacing to be broken down into 0.1 mil increments.

Another important cause of missed targets is wind. The shooter must learn to take into effect wind speed and its exact direction. At the longer ranges, there can actually be several different winds. There may be one wind from left to right at 9 mph and then further out a second or third wind in a different direction and speed. All these winds must be calculated. The shooter has to properly gauge the wind speed using natural indicators like grass, smoke drift, and trees. Of the many types of wind indicators, the most accurate is reading mirage. Reading mirage is conducted by watching and interpreting the heat waves moving above the ground. The shooter plugs this information into another algebraic formula along with distance and time of bullet flight then divides that answer by a "constant" number, which is dependent upon the target distance. With this new data, the shooter adjusts the scope's settings to cancel out the effect of the wind. Compensating for wind can also be accomplished by holding off to different locations on the reticle.

During the detailed search, the team also identifies dead space and areas that require special attention. Shooter/spotter dialog is a process that allows the team to communicate in a quick, efficient manner regarding the target locations, range estimations, wind directions, fire commands, shot calls, target status or continued fire commands.

The shooter informs the spotter of the shooter's point-of-aim and how the shots should be called. The spotter will call the shot, either high/low or left/right to help the shooter to align with the target regardless the shooter's narrow field of view via the reticle. A knowledgeable spotter can, through verbal instruction, talk the shooter onto a target and obtain a hit. It is very difficult (if not impossible) to make a wind call and follow a trace through the riflescope. With the senior member as the spotter, the spotter can have the shooter train on the primary target while the spotter surveys the surrounding terrain and makes tactical decisions. Once the shot is fired the spotter can follow the trace to the target and make any adjustments for a follow-up shot. The spotter makes the shooter aware of any missing targets as well as notifying the line official if an alibi is needed. The spotter communicates with the neighboring spotter if a needed target is available. The spotter also notifies the shooter if a possible unsafe condition exists.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A reticle comprising an optical center and a plurality of measuring points, said measuring points formed by a primary vertical line, a primary horizontal line intersecting said primary vertical line at the optical center, a plurality of dots intersecting said primary lines and evenly spaced at a predetermined distance along said primary lines, a plurality of secondary lines intersecting one of said primary lines and evenly spaced between the dots therein, each said intersecting lines forming one of said plurality of measuring points, wherein the secondary lines are shorter than 0.2 mil.

2. The reticle according to claim 1, wherein the a predetermined distance is a mil.

3. The reticle according to claim 1, wherein the dots are 0.2 mil or 0.68 minute round.

4. The reticle according to claim 1, wherein the measuring points also function as aiming points for moving targets, elevation/windage bold-offs, or quick follow-up shots.

5. The reticle according to claim 1, wherein the dots and lines are at least one of acid-etched or laser-engraved on the reticle.

6. The reticle according to claim 5, wherein the lines and dots are further chrome filled.

7. The reticle according to claim 1, wherein the dots and lines are defined in black.

8. The reticle according to claim 1, wherein the reticle is illuminated with a light.

9. The reticle according to claim 1, further comprising posts each at one end of the primary lines.

10. The reticle according to claim 1, wherein the posts are at least one of defined in black and formed to be seen-through so as to be illuminated at different intensities.

11. The reticle according to claim 1, wherein the secondary lines are 0.15 mil long.

12. The reticle according to claim 1, wherein the secondary lines are 0.061 mil thick for a 3.5×–10× first focal plane reticle, 0.09 mil for a 2.5×–8× first focal plane reticle, 0.05 mil for a 4.5×–14× first focal plane reticle, 0.026 mu for a 6.5×–20× first focal plane reticle, or 0.022 mil for a 8.5× –25× first focal plane reticle.

13. A reticle comprising an optical center and a plurality of measuring points, said measuring points formed by a primary vertical line, a primary horizontal line intersecting said primary vertical line at the optical center, posts on ends of the primary lines, at least one post on at least one end of the primary lines, a plurality of dots intersecting said primary lines and evenly spaced at a predetermined distance along said primary lines, a plurality of secondary lines intersecting one of said primary lines and evenly spaced between the dots therein, a plurality of third lines intersecting one of said post and evenly spaced between, each said intersecting lines forming one of said plurality of measuring points.

14. The reticle according to claim 13, wherein each of said post is 1 mil wide for a 3.5×–10× or 4.5×–14× scope, 1.25 mil for a 2.5×–8× scope, 0.75 mil and for a 6.5×–20× or 8.5×–25× scope.

15. The reticle according to claim 13, wherein each of said third lines is 2 mil long for a 3.5×–10× or 4.5×–14× scope, 2.5 mils for a 2.5×–8× scope, and 1.5 mils for a 6.5×–20× or 8.5×–25× scope.

16. The reticle according to claim 13, wherein said (third lines) are 5 mils apart from each other on said post.

17. The reticle according to claim 13, wherein a number of the third lines positioned on each of said post varies based on magnification.

18. A scope having a reticle with an optical center and a plurality of measuring points, said measuring points formed by a primary vertical line, a primary horizontal line intersecting said primary vertical line at the optical center, a plurality of dots intersecting said primary lines and evenly spaced at a predetermined distance along said primary lines, a plurality of secondary lines intersecting at least one of said primary lines and evenly spaced between the dots therein, each said intersecting lines forming one of said plurality of measuring points, wherein the secondary lines are shorter than 0.2 mil.

19. A scope having a reticle comprising an optical center and a plurality of measuring points, said measuring points formed by a primary vertical line, a primary horizontal line intersecting said primary vertical line at the optical center, posts on ends of the primary lines, posts on ends of the primary lines, a plurality of dots intersecting said primary lines and evenly spaced at a predetermined distance along said primary lines, a plurality of secondary lines intersecting one of said primary lines and evenly spaced between the dots therein, a plurality of third lines intersecting one of said posts and evenly spaced between, each said intersecting lines forming one of said plurality of measuring points.

* * * * *